United States Patent
Mishra et al.

[11] Patent Number: 5,946,324
[45] Date of Patent: Aug. 31, 1999

[54] METHOD FOR FAIR ALLOCATION OF BANDWIDTH

[75] Inventors: Partho Pratim Mishra, Summit; Kadangode K. Ramakrishnan, Berkeley Heights, both of N.J.

[73] Assignee: AT&T Corp., Middletown, N.J.

[21] Appl. No.: 08/825,995

[22] Filed: Apr. 4, 1997

[51] Int. Cl.$^6$ .................................................. H04J 3/14
[52] U.S. Cl. ............................................................ 370/468
[58] Field of Search ................................... 370/468, 465, 370/431, 433, 437, 463

[56] References Cited

U.S. PATENT DOCUMENTS 5,258,979  11/1993  Oomuro .
5,263,025  11/1993  Torri et al. .............................. 370/468
5,313,467  5/1994  Varghese et al. ....................... 370/468

*Primary Examiner*—Huy D. Vu

[57] ABSTRACT

A method is provided for allocating the bandwidth of a shared resource. The resource takes into account not only the explicit rates allocated to sources by upstream bottlenecks but also takes into account the original relative demands of the sources either in terms of the actual demand placed into the networks by the respective sources or in terms of some other parameter indicative of the demands of the source, such as a minimum rate necessary to provide useful service for the source.

13 Claims, 4 Drawing Sheets

METHOD FOR FAIR ALLOCATION OF
BANDWIDTH

BACKGROUND OF THE INVENTION

The present invention relates to a method for providing fair allocation of bandwidth in a communication system. More particularly, the present application is directed to a method for allocating bandwidth in a network in which a plurality of sources can request a bandwidth allocation and the network then determines how to allocate the bandwidth among the sources.

As people continue to expand the ways in which they communicate, data communication between users of a network has become more and more critical. Data can represent many different things, for example video images, facsimiles, processing data. There is tremendous demand for greater and greater data transfer capabilities. Many different network arrangements have been proposed for facilitating the transfer of data. Among them have been networks referred to as Asynchronous Transfer Mode (ATM) networks.

It has been recognized, however, that even in networks which are better suited for the transfer of data, such as ATM networks, it is necessary to allocate network resources, such as bandwidth typically described in terms of a bit rate, among more and more demanding sources of data.

Rate-based congestion management has been proposed for feedback control of ATM networks. A number of different services have been proposed for the ATM networks including a service referred to as Available-Bit-Rate (ABR) service. This service has been considered to be effective for transmitting bursty data where there is no clear specification of the source's characteristics. The service provides an explicit rate feedback control by: receiving a resource management cell from a source, which cell designates the source's demand for rate allocation; each switch along the connection from a source to a destination identifies and conveys its own congestion state back to the source-end system via the resource management cell.

An example of a network configuration in which the ABR scheme may be employed is illustrated in FIG. 1. Here there are four data sources, 10, 11, 12 and 13 respectively, each sending data to one of four destinations, 20, 21, 22 and 23 respectively. The data communications are transmitted via the ATM network 30 which contains a plurality of switches, for example 31, 32, 33 and 34. Assume that the first data source 10 is transmitting data to the first destination 20 via switches 31 and 32. Switch 31 also receives data from the fourth source 13. Thus, switch 31 must allocate its channel capacity between these two data sources. Each data source will submit a resource management (RM) cell to request a particular bit rate be allocated. If switch 31 has sufficient capacity to satisfy the demand from both source 10 and source 13 then it will grant the demand from the sources and will be able to send all of the data to switch 32. The data will include the resource management cells transmitted from the sources. Since both sources have been satisfied the resource management cell will continue to include the demanded rate, without being marked down at any switch. Assume for a moment that switch 33 receives the resource management cells from data sources 11 and 12 and that because of its channel capacity the switch cannot satisfy both of these sources. Then the switch must allocate the channel bandwidth between the two sources. Assume for a moment that both sources demand more than half of the channel capacity of switch 33 and the switch by its allocation algorithm assigns half the channel capacity to each source, then both sources remain unsatisfied and the switch overwrites the resource management cells replacing the Demands with the explicit rate (ER) allocated by switch 33. Then, as switch 33 sends the data from sources 11 and 12 to switch 32, the resource management cells reflect the congestion arising at switch 33. As the RM cell for a source flows to its destination the ER field can be overwritten (marked down) any number of times (once at each switch it traverses, where the capacity that can be allocated successively reduces). The source is then notified of the allowed or allocated rate when the modified RM cell is returned to the source.

There are known techniques for performing the allocation. For instance the allocation that will subsequently take place at switch 32 could use a simple process to allocate a share of capacity to each competing source. In particular, the allocation at switch 32 could rely upon comparing the overall channel capacity of 32 to the total capacity requested by the various sources in accordance with the state of the resource management cell as it is received at switch 32. Thus, the determination at switch 32 is based on decisions made by switches upstream, that is the congestion rates exemplified by modified RM cells, and does not take into account the actual demand initially sent to the network by the various data sources. This can be disadvantageous since as between certain sources having the same explicit rate (ER) in the RM cell defined for them by upstream switches, one of those data sources may have a dramatically higher demand which is provided in the hopes of maintaining a certain data quality, for instance in a video environment. Thus, the known allocation algorithms do not adequately account for the needs of the data sources, but instead are very heavily dependent on the state of congestion at upstream bottlenecks.

SUMMARY OF THE INVENTION

The present invention provides an improved allocation of shared resources. In particular, the present invention provides an allocation mechanism which takes into account not only the explicit rate granted by congested bottlenecks upstream, but also the rate initially demanded by the source. Initial weights for attempting to allocate channel capacity are calculated using the original demand rates from the various sources that are transmitting through the channel in question. By calculating weights for allocations using the initial demands from the sources the present invention better allocates resources to those having expressed a higher need for those resources even where intervening bottlenecks may have already limited the source's capacity.

DETAILED DESCRIPTION

As described above a number of techniques for allocation already exist. One such technique employs a max-min fairness goal for allocation of shared resources. This technique applies a uniform criterion for allocation of resources to bottlenecked flows. When there are competing, but bottlenecked flows at a given resource, the bandwidth allocated to these flows is identical. This may be an appropriate decision for sources generating data which do not suffer dispropotionately because of the amount of reduction below their demand that the network imposes on the data sources.

However, this is not always the case. In fact, it is possible that for some sources like video, applying such a uniform criterion can be detrimental to one or more of the sources. As an example, when two video sources are compared and those two sources place different demands on a bottleneck resource, the impact of the change in the rate (as compared to their demand) is different for each of them, when the network applies the max-min fairness criterion. The source with the higher demand therefore has to adjust the encoder's rate significantly more than the other source with a lower demand. This can result in more degradation in the quality for the high-rate source in comparison to the other source. In the video source context, a source that has a high demand may be requesting bandwidth to transmit frames in a high-activity scene (such as an I-frame with MPEG encoded video). As a result, the quality degradation that source may suffer from bandwidth reduction may be more significant than for a lower demand source.

In accordance with the present invention the network treats flows unequally so as to provide a relationship between the ultimate "quality of service" achieved for the flow and the degree of rate reduction experienced by the flow in comparison to its demand. A rate reduction to a low demand source, with the assurance that the actual rate does not go below the minimum rate allocated for the flow, may have less impact on the quality proportionately.

In accordance with an embodiment of the present invention, the source still generates a demand which is transmitted to the network in a resource management cell. That cell is then transmitted through the network downstream from the source to the destination terminal. In accordance with the present invention the resource management cell contains at least three important pieces of information relating to rates. The first piece of information is the demand rate (D), the second piece of information is the explicit rate (ER) granted by the bottlenecks, and the third rate is the current rate (here represented as CCR which reflects the current cell rate). As the RM cell is transferred through the network the only one of these three pieces of information which is changed is the explicit rate as the information passes downstream and experiences tighter and tighter bottlenecks if that situation should arise.

Figure 1:
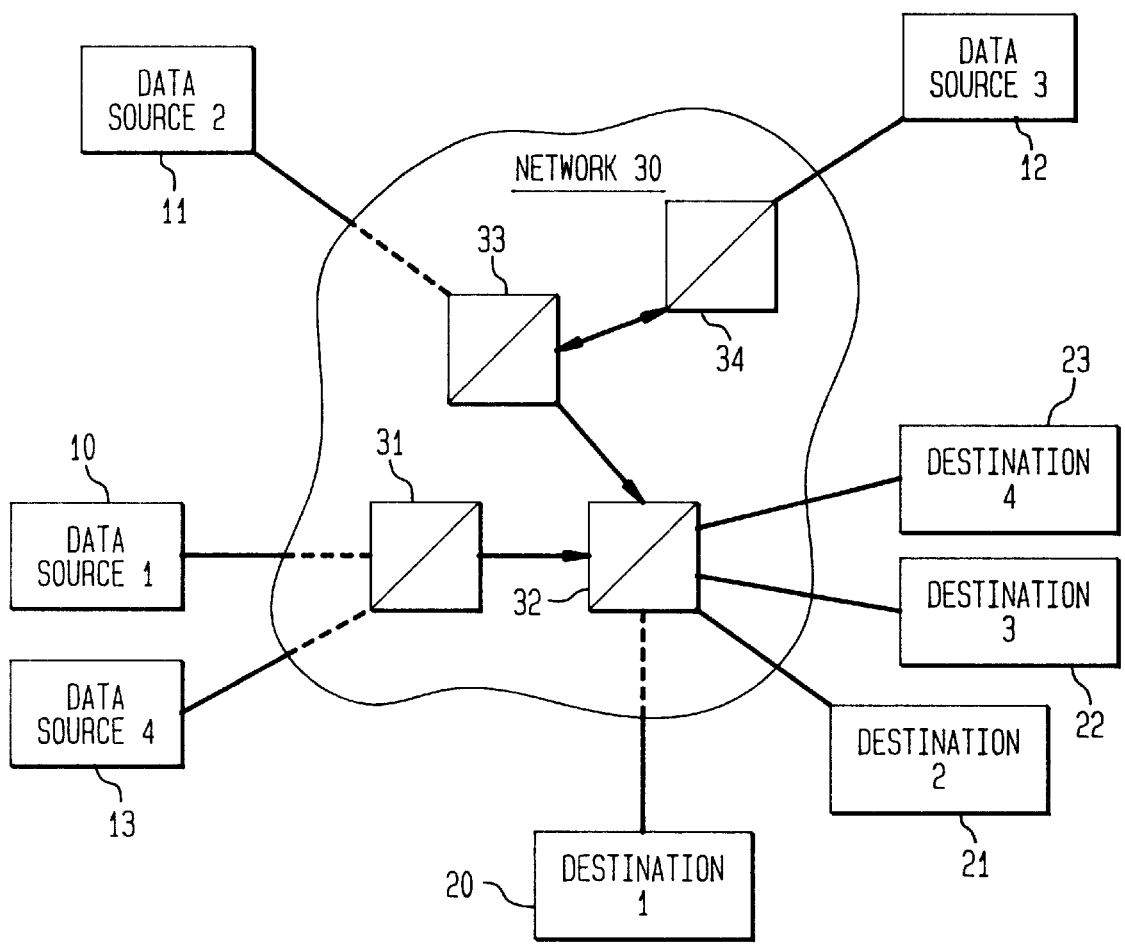
FIG. 1 illustrates an example of a network in which the present invention can be employed.
Figure 2:
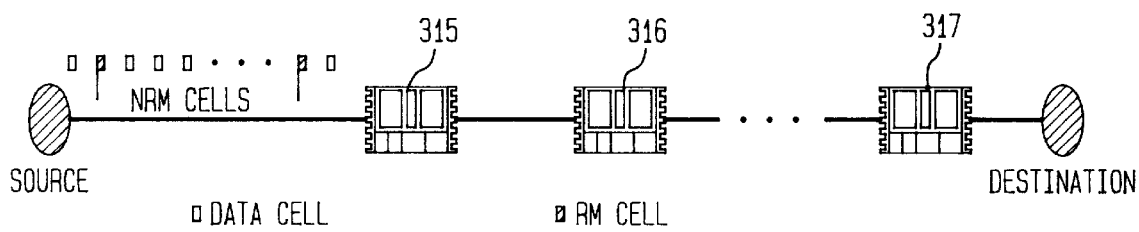
FIG. 2 illustrates an example of requesting rate allocations in the network of FIG. 1.
Figure 3A:
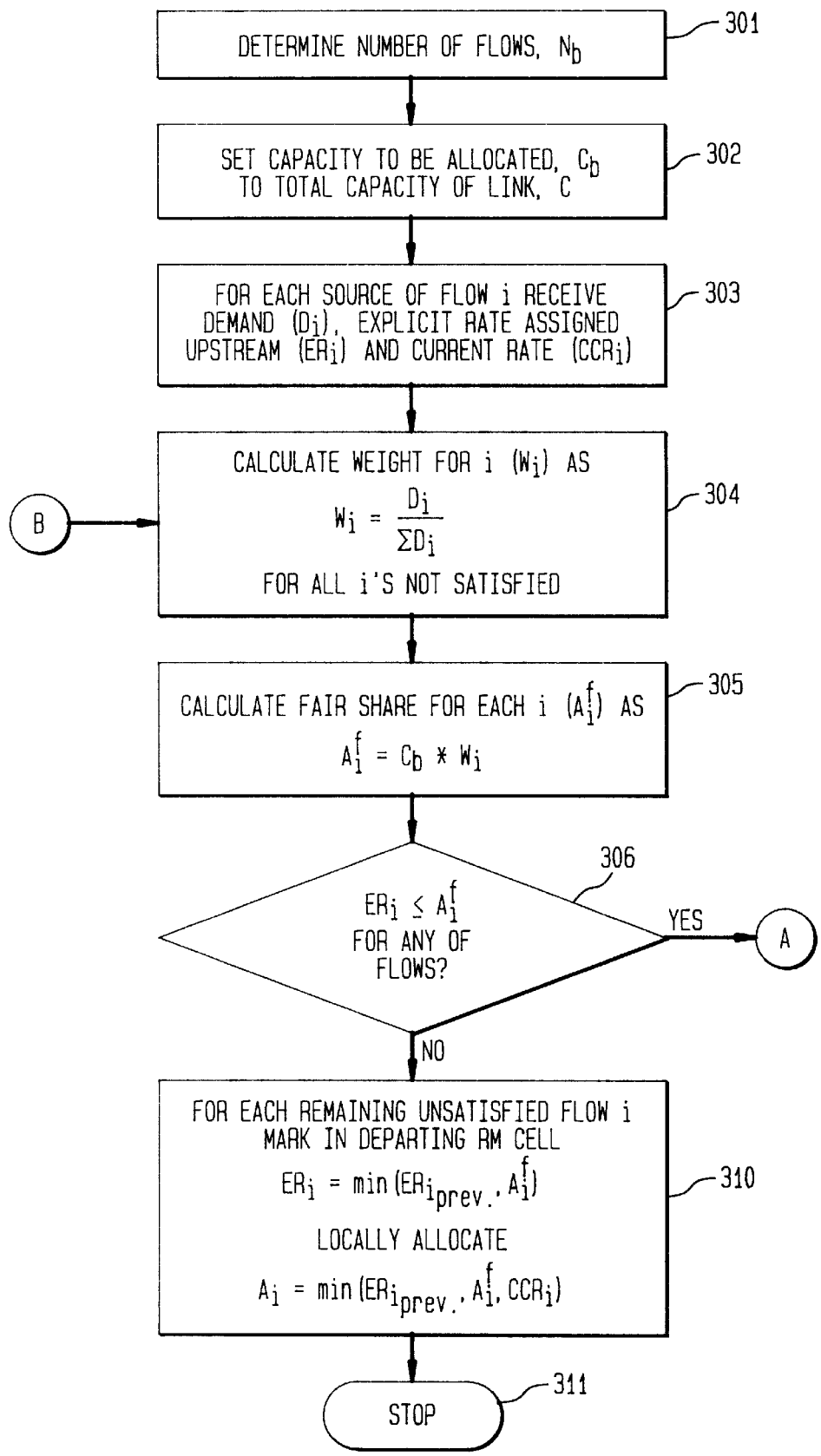
FIGS. 3A and 3B combined together constitute a basic flowchart representing an operation of an embodiment of the present invention in the configuration of FIG. 1.
Figure 3B:
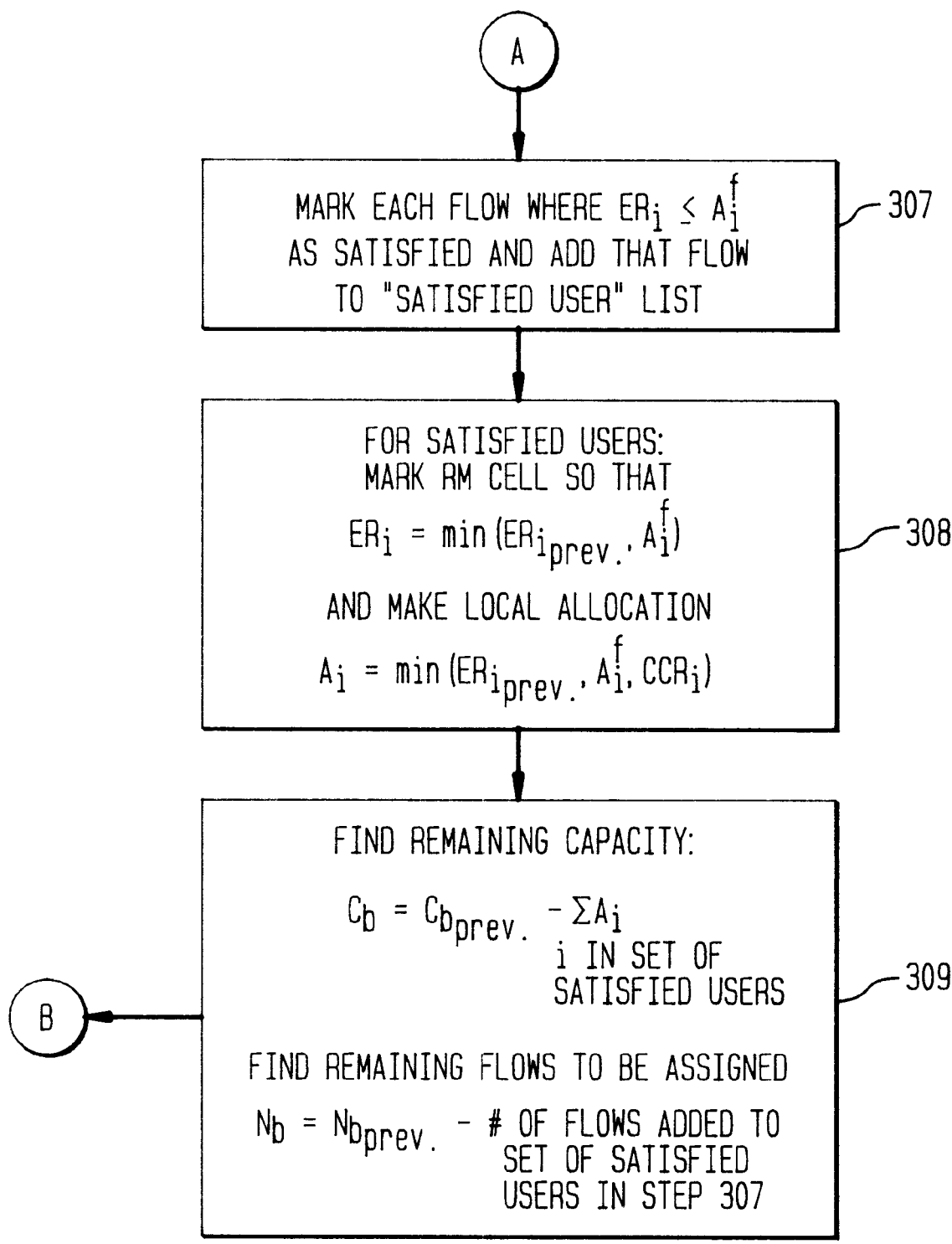

FIGS. 3A and 3B illustrate a flow chart for a process for performing an allocation of bandwidth (here in terms of cell rates) based on these three pieces of information.

In accordance with the present invention, a weighted fairness criterion is applied at each resource for the different flows placing a demand on that resource. The source's original demand is the basis for assigning a weight to the flow associated with that source. The resource determines the number of flows $N_b$, step 301. It also sets the capacity to be allocated $C_b$ to a total capacity of the link C, step 302. For each source or flow "i" the resource receives a demand ($D_i$), the explicit rate (ERi), and a current rate (CCRi) (step 303). The resource then calculates as $w_i$ where $$W_i = \frac{D_i}{\sum D_i}$$

As an initial matter, all flows are treated as not being satisfied in the first iteration of the computation. Then, the resource calculates a fair share for each flow ($A^f_i$) as $A^f_i = C_b * W_i$. The resource then checks the explicit rates received with respect to each of the flows and determines which, if any, of the flows has an $Er_i \leq$ the fair share calculated for that flow ($A^f_i$). If any such flows satisfy that equation, that flow is deemed to be satisfied, that is, the flow can be allocated the rate ER which it has requested and which takes into account upstream bottlenecks. Each such flow that is considered to be satisfied is added to a "satisfied user" list in step 307.

For satisfied users the resource then marks the RM cell for that user so that the explicit rate field, $ER_i$ is written with the minimum of either the explicit rate received, the allocated fair share. Furthermore, the resource makes a local allocation at that resource to the flow i such that $A_i$ is assigned the minimum of $ER_{iprev}$, $A^f_i$, or $CCR_i$. This treatment of satisfied users takes place in step 308. Having augmented the set of satisfied users, the source then determines the remaining capacity and the remaining flows to be assigned. In particular, $C_b$ is recalculated to correspond to $C_{bprev}$ minus the sum of all of the local allocations for those satisfied users added to the satisfied users list. Furthermore, the remaining flows to be assigned are recalculated such at $N_b$ corresponds to $N_{bprev}$ minus the number of flows added to the set of satisfied users in step 307. This readjustment of capacity and the remaining flows is performed in step 309.

After the calculation of the remaining capacity and the remaining flows the process returns to step 304 and repeats steps 304, 305 and 306 for all of the remaining flows. The process steps will be repeated so long as in each iteration at least one additional source has been identified as being satisfied so as to answer the condition in step 306 as "yes" and then repeat steps 307 to 309. If, however, upon completion of step 306 it is discovered that no one of the remaining flows has an $ER_i$ which is less than a calculated fair share, then the process jumps to step 310 allocating the remaining bandwidth to the remaining group of unsatisfied users. In this circumstance, according to the allocation method, for each remaining unsatisfied flow "i" the resource marks in the departing RM cell that the explicit rate is the minimum of $ER_{iprev}$ or $A^f_i$ which, based on the condition in step 306, indicates that the latter value is assigned to the RM cell. Furthermore, the system then locally allocates for that flow the minimum of $ER_{iprev}$ or $A^f_i$ or $CCR_i$ and then stops.

Thus, sources whose weighted fair share of the resource exceeds their rate request as observed in the ER field of an RM cell will not be bottlenecked at the resource. However, for those sources that are bottlenecked at this resource, and hence limited by this resource, each receives a weighted share of the resource's capacity that may be allocated to bottlenecked sources (actual capacity—capacity allocated to non-bottlenecked sources) where the weight is based on the relative needs of the bottlenecked sources. The guarantee is also that the allocation to bottlenecked sources is greater than the allocation to a satisfied source at this resource.

Thus, as desired the present allocation technique operates to reduce the likelihood that bottlenecks will produce greatly disproportionate impacts on the quality of data transmissions affected by the bottlenecks.

The following Example is beneficial for understanding the process of the invention.

Example

| | | | |
|---|---|---|---|
| Assumptions: | Total Capacity C = 100; Five Flows (i = 1 to 5); and RM cell information for flows is | | |
| $Flow_i$ | $Demand_i$ | $ER_i$ | $CCR_i$ |
| 1 | 10 | 10 | 10 |
| 2 | 20 | 20 | 20 |
| 3 | 30 | 30 | 30 |
| 4 | 40 | 30 | 30 |
| 5 | 100 | 20 | 20 |

Thus, $C_b = 100$, $N_b = 5$.

Calculation of initial weights $N_i$ yields:

$$W_1 = \frac{D_1}{\sum D_1} = \frac{10}{200} = .05$$
$$i = 1 \text{ to } 5$$

similarly $W_2 = 0.10$
$W_3 = 0.15$
$W_4 = 0.20$
$W_5 = 0.50$

Calculation of fair share based on weights: $A_i = W_i * C_b$ yields:

$A_1 = 5$
$A_2 = 10$
$A_3 = 15$
$A_4 = 20$
$A_5 = 50$

The only flow that can be satisfied is i=5 because $ER_5 = 20 \leq A_5 = 50$

So, $A_5$ is added to Satisfied list and $ER_5$ is set to 20
$C_b = 100$-rate allocated to $A_5 = 100 - 20 = 80$
Then weights are recalculated for remaining flows $$W_1 = \frac{D_1}{\sum D_1} = .10$$
$$i = 1 \text{ to } 4$$

$W_2 = 0.20$
$W_3 = 0.30$
$W_4 = 0.40$

Calculation of New Fair Share based on $A_i = W_i C_b$ yields $A_1 = 8$
$A_2 = 16$
$A_3 = 24$
$A_4 = 32$ Thus, since $ER_4 = 30 < A_4 = 32$ flow 4 is satisfied New $C_b = 80 - 30 = 50$
Recalculate weights $$W_1 = \frac{D_1}{\sum D_1} = .17$$
$$i = 1 \text{ to } 3$$

$W_2 = 0.33$
$W_3 = 0.50$

Calculation of New Fair Share yields $A_1 = 8$
$A_2 = 17$
$A_3 = 25$

None of these three are satisfied, therefore they are assigned their fair share based on this last calculation so that $ER_1$ changed to 8;
$ER_2$ changed to 17;
$ER_3$ changed to 25;

Note that as a consequence of weighted fair share allocation two of the sources having higher ERs, sources 4 and 5 wound up with higher allocated rates and were satisfied while the source with the lowest ER, source 1, did not get satisfied. This is because those two sources 4 and 5 had the highest original demand rates. By contrast, under the allocation scheme of the prior art the sources having the lowest Ers are more likely to be treated as satisfied. This can be shown with a comparative example using the same assumptions as above but applying a more traditional max-min fairness goal.

$$Avg = \frac{C_b}{N_b} = \frac{100}{5} = 20$$

Flows 1 and 2 are satisfied since $ER_1 = 10$ and $ER_2 = 20$ $$\text{then } NewAvg = \frac{70}{3} = 23$$

only Flow 5, $ER_5 = 20$, is satisfied $$\text{then } NewAvg = \frac{50}{2} = 25$$

Neither flow 3 nor flow 4 are satisfied so $ER_3$ is changed to 25 and $ER_4$ is changed to 25.

In this scheme one of the flows already subjected to a bottleneck and hence a potential degradation, flow 4, is subjected to a further cut in rate. This differs significantly from the process of the present invention where the bottleneck at this node is made to affect those who had not previously been affected by a bottleneck.

The invention can be modified to a certain degree and still provide advantages over the max-min fairness allocation known in the prior art. In particular, the starting point for creating weights could rely upon information concerning the minimum cell rate attributed to each flow, rather than a demand rate received from the flow. To a certain degree the minimum cell rate (MCR) also reflects the nature of the data which is to be transmitted in that it is the absolute minimum rate that the source can operate at to provide serviceable data. If the minimum cell rate information is used in place of the demand rate in the process described above then the entire process need not be repeated as frequently since the minimum cell rate is likely to change less frequently than the demand rates that we have described above.

It should also be noted that replacing the minimum cell rate for the demand rate means that the allocation scheme is equally applicable in those systems where there is no regular demand made upon the system by the sources, that is the sources do not request particular values for allocation rates. Thus, the present invention is equally applicable in those networks where there is some parameter analogous to either the demand or the minimum cell rate which is indicative of the general nature of the source of data and its requirements and that parameter may be used to calculate weights for a weighted fair share of the available bandwidth of the resource.

The present invention is useful in the context of the transfer of any type of data across a network. However, the inventors have found that the allocation mechanism has particular benefit in the transmission of compressed video in ATM works of the type described above, namely those employing the ABR service class.

What is claimed is:

1. In a system for transporting data, a method for allocating bandwidth among a plurality of sources desiring to use a node the method comprising the steps of:
   a. receiving, for each of the plurality of sources, an explicit rate (ER) granted to that source at some point upstream of the node and that source's demand and initially treating each source as unsatisfied;
   b. determining a weight for each unsatisfied source with reference to that source's demand;
   c. determining a fair share of bandwidth for each source based on the determined weights;
   d. for each source treated as unsatisfied comparing that source's determined fair share to that source's explicit rate and identifying whether any sources are satisfied based on the comparison;
   e. recalculating capacity available for allocation taking into account sources identified as satisfied in step d.;
   f. if at least one but less than all of the sources are identified as satisfied in step d., repeat steps b., c., d., e.; and
   g. if no sources are identified as satisfied in step d. then assign new explicit rate to any remaining unsatisfied sources based on the determined fair share of bandwidth.

2. The method of claim 1 wherein said step of receiving includes receiving a resource message from each source including a field identifying that source's demand and the source's explicit rate.

3. The method of claim 2 wherein said resource message further includes a field identifying a current operational bandwidth.

4. The method of claim 3 wherein said step of recalculating capacity employs said current operational bandwidth.

5. The method of claim 2 further comprising the step of assigning a new explicit rate includes over writing a source's explicit rate in the resource message.

6. In a system for transporting data, a method for allocating bandwidth to a plurality of sources desiring to use a node, the method comprising the steps of:
   a. for each source receiving an explicit rate (ER) granted to that source at a point upstream of the node and initially treating each source as unsatisfied;
   b. determining a weight for each unsatisfied source with reference to quality of service demands for that source;
   c. determining a fair share of bandwidth for each source based on the determined weights;
   d. for each source treated as unsatisfied comparing that source's determined fair share to that source's explicit rate and identifying whether any sources are satisfied based on the comparison;
   e. recalculating capacity available for allocation taking into account sources identified as satisfied in step d.;
   f. if at least one but less than all of the sources are identified as satisfied in step d., repeat steps b., c., d., e.; and
   g. if no sources are identified as satisfied in step d. then assign new explicit rate to any remaining unsatisfied sources based on the determined fair share of bandwidth.

7. The method of claim 6 wherein said step of receiving includes receiving a resource message from each source including a field identifying that source's demand and the source's explicit rate.

8. The method of claim 7 wherein said resource message further includes a field identifying a current operational bandwidth.

9. The method of claim 8 wherein said step of recalculating capacity employs said current operational bandwidth.

10. The method of claim 6 further comprising the step of assigning a new explicit rate includes over writing a source's explicit rate in the resource message.

11. The method of claim 6 wherein said quality of service demands for a source is related to a minimum bandwidth allocated to that source.

12. A method of allocating bandwidth to a plurality of sources at plural nodes in a network between a source and a destination terminal, comprising the steps of:
    at a first node
      a) for each of the sources desiring to use the first node, receiving an explicit rate granted to that source at some point upstream of said first node, that source's current operating bandwidth and that source's demand, and initially treating each source as unsatisfied;
      b) determining a weight for each unsatisfied source with reference to the source's demand;
      c) determining a fair share of bandwidth based on the determined weights;
      d) for each source treated as unsatisfied comparing that source's determined fair share to that source's explicit rate and identifying whether any sources are satisfied based on the comparison;
      e) recalculating capacity available for allocation taking into account the current operating bandwidth of each source identified as satisfied in step d.;
      f) if at least one but less than all of the sources are identified as satisfied in step d., repeat steps b., c., d., e.; and
      g) if no sources are identified as satisfied in step d. then assign new explicit rate to any remaining unsatisfied sources based on the determined fair share of bandwidth;
    at a second node, downstream of said first node
      h) for each of the sources desiring to use the second node, receiving an explicit rate granted to that source at some point upstream of said second node, that source's current operating bandwidth and that source's demand, and initially treating each source as unsatisfied;
      i) determining a weight for each unsatisfied source with reference to the source's demand;
      j) determining a fair share of bandwidth based on the determined weights;
      k) for each source treated as unsatisfied comparing that source's determined fair share to that source's explicit rate and identifying whether any sources are satisfied based on the comparison;
      l) recalculating capacity available for allocation taking into account the current operating bandwidth of each source identified as satisfied in step d.;
      m) if at least one but less than all of the sources are identified as satisfied in step k., repeat steps i., j., k., l.; and n) if no sources are identified as satisfied in step k. then assign new explicit rate based on the determined fair share of bandwidth; and returning to each source the explicit rate designated as allowed to that source at the node immediately upstream of the destination-terminal.

13. The method of claim 12 comprising the further steps of:

adapting, at one of said sources, a current operating bandwidth based on the explicit rate returned to said one of said sources; and at a first node o) for each of the sources desiring to use the first node, receiving an explicit rate granted to that source at some point upstream of said first node, that source's adapted current operating bandwidth and that source's demand, and initially treating each source as unsatisfied;

p) determining a weight for each unsatisfied source with reference to the source's demand;

q) determining a fair share of bandwidth based on the determined weights;

r) for each source treated as unsatisfied comparing that source's determined fair share to that source's explicit rate and identifying whether any sources are satisfied based on the comparison;

s) recalculating capacity available for allocation taking into account the current operating bandwidth of each source identified as satisfied in step r.;

t) if at least one but less than all of the sources are identified as satisfied in step r., repeat steps p., q., r., s.; and u) if no sources are identified as satisfied in step r. then assign new explicit rate to any remaining unsatisfied source based on the determined fair share of bandwidth;

at a second node, downstream of said first node v) for each of the sources desiring to use the second node, receiving an explicit rate granted to that source at some point upstream of said second node, that source's current operating bandwidth and that source's demand, and initially treating each source as unsatisfied;

w) determining a weight for each unsatisfied source with reference to the source's demand;

x) determining a fair share of bandwidth based on the determined weights;

y) for each source treated as unsatisfied comparing that source's determined fair share to that source's explicit rate and identifying whether any sources are satisfied based on the comparison;

z) recalculating capacity available for allocation taking into account the current operating bandwidth of each source identified as satisfied in step y.;

aa) if at least one but less than all of the sources are identified as satisfied in step y., repeat steps x., y., z., aa.; and bb) if no sources are identified as satisfied in step y. then assign new explicit rate to any remaining unsatisfied source based on the determined fair share of bandwidth; and returning to each source the explicit rate designated as allowed to that source at the node immediately upstream of the destination-terminal.

* * * * *